United States Patent
Takahashi et al.

(10) Patent No.: US 8,042,490 B2
(45) Date of Patent: Oct. 25, 2011

(54) ANIMAL WASTE COLLECTION SHEET

(75) Inventors: Masayuki Takahashi, Tokyo (JP); Takeshi Ikegami, Tokyo (JP)

(73) Assignee: Uni-Charm Corporation, Ehime (JP)

(*) Notice: Subject to any disclaimer, the term of this patent is extended or adjusted under 35 U.S.C. 154(b) by 70 days.

(21) Appl. No.: 12/146,023

(22) Filed: Jun. 25, 2008

(65) Prior Publication Data
US 2009/0000557 A1 Jan. 1, 2009

(30) Foreign Application Priority Data

Jun. 29, 2007 (JP) .................... 2007-173556

(51) Int. Cl.
*A01K 23/00* (2006.01)
*A01K 29/00* (2006.01)

(52) U.S. Cl. ........................ 119/171; 119/169

(58) Field of Classification Search ............ 119/161, 119/169, 170; *A01K 23/00, 29/00*
See application file for complete search history.

(56) References Cited

U.S. PATENT DOCUMENTS

| | | | | |
|---|---|---|---|---|
| 3,626,899 | A * | 12/1971 | Spellman | 119/169 |
| 5,178,426 | A * | 1/1993 | David et al. | 294/1.3 |
| 5,630,376 | A * | 5/1997 | Ochi et al. | 119/169 |
| 5,715,772 | A * | 2/1998 | Kamrath et al. | 119/169 |
| 5,797,347 | A * | 8/1998 | Ochi | 119/169 |
| 6,039,555 | A | 3/2000 | Tsuji et al. | |
| 6,096,016 | A | 8/2000 | Tsuji et al. | |
| 6,176,954 | B1 | 1/2001 | Tsuji et al. | |
| 6,244,216 | B1 * | 6/2001 | Ochi | 119/171 |
| 6,274,218 | B1 * | 8/2001 | Shimizu | 428/137 |
| 6,460,484 | B2 * | 10/2002 | Ikegami et al. | 119/169 |
| 7,249,570 | B1 * | 7/2007 | Roberson | 119/169 |
| 7,594,754 | B2 * | 9/2009 | Costello | 383/4 |
| 2003/0143376 | A1 | 7/2003 | Toyoshima et al. | |
| 2005/0109284 | A1 * | 5/2005 | Helfman | 119/161 |
| 2005/0166855 | A1 * | 8/2005 | Kaneko et al. | 119/169 |
| 2005/0166856 | A1 * | 8/2005 | Kaneko et al. | 119/169 |
| 2006/0200104 | A1 * | 9/2006 | Kaneko et al. | 604/358 |
| 2006/0260556 | A1 * | 11/2006 | Renforth | 119/169 |
| 2007/0000446 | A1 * | 1/2007 | Dunn et al. | 119/161 |
| 2008/0271679 | A1 * | 11/2008 | Kaneko et al. | 119/169 |
| 2009/0044756 | A1 * | 2/2009 | Otsuji et al. | 119/169 |

FOREIGN PATENT DOCUMENTS

| | | |
|---|---|---|
| JP | 09-234220 | 9/1997 |
| JP | 3056800 | 3/1999 |
| JP | 11-276519 A1 | 10/1999 |
| JP | 2001-218535 | 8/2001 |
| JP | 2001309730 | 11/2001 |
| JP | 2003102304 | 4/2003 |
| JP | 2003-250836 | 9/2003 |
| JP | 2005198598 | 7/2005 |
| JP | 2006-000102 | 1/2006 |
| JP | 2006-181294 | 7/2006 |

* cited by examiner

*Primary Examiner* — Son T Nguyen
*Assistant Examiner* — Shadi Baniani
(74) *Attorney, Agent, or Firm* — Brinks Hofer Gilson & Lione (57) ABSTRACT

The animal waste collection sheet is planar and is consisted of a top sheet which is liquid permeable, a back sheet which is liquid impermeable and an absorbent sheet disposed between the top sheet and the back sheet. The top sheet has a high fiber density region in a thickness direction thereof, with a fiber density higher than an average fiber density of the top sheet, at least in a part of a side facing the absorbent sheet. The average fiber density is preferably in the range of 0.005 to 0.20 g/cm³, and a fiber density of the high fiber density region is preferably in the range of 0.007 to 0.25 g/cm³.

8 Claims, 6 Drawing Sheets

ANIMAL WASTE COLLECTION SHEET

This application is based on and claims the benefit of priority from Japanese Patent Application No. 2007-173556, filed on 29 Jun. 2007, the content of which is incorporated herein by reference.

BACKGROUND OF THE INVENTION

1. Field of the Invention

The present invention relates to an animal waste collection sheet for disposing the discharged matter of pets and the like.

2. Related Art

Conventionally, a so-called pet sheet using an absorbent sheet has been known as a pet litter for indoor-kept animals such as dogs and cats, to facilitate the disposal of discharged matter such as urine. For example, Japanese Unexamined Patent Application No. 2001-309730 (hereinafter referred to as Patent Document 1) and Registered Utility Model No. 3056800 (hereinafter referred to as Patent Document 2) disclose planar pet sheets including a top sheet which is liquid permeable, a back sheet which is liquid impermeable and an absorbent sheet disposed between the top sheet and the back sheet.

In general, a top sheet constituting a pet sheet such as the abovementioned Patent Documents 1 and 2 includes a conventionally known point bond non-woven fabric, a perforated film and the like. However, pet sheets using these conventional top sheets have following problems: leakage of the discharged matter from edge portions of pet sheet, due to running of the liquid on the top sheet and lack of liquid holding capacity; a highly visible urine trace due to a low masking property, leading to an unclean appearance after a repeated use; and a damp or chill surface due to absorbed urine, which discourages pets against using the pet sheet repeatedly.

To address the abovementioned problems, the thickness or the weight of a non-woven fabric constituting the top sheet may be simply increased for an increased masking property and a lowered thermal conductivity. However, a top sheet with increased thickness or weight retains urine and does not allow the urine to be completely absorbed by an absorbent body, and is unfavorable in view of appearance and hygiene. Especially, since pet sheet is a product generally used indoors such as living rooms, solution for the abovementioned problems is extremely important for the target animals and the users; however, function of the conventional pet sheets are insufficient and unsatisfying.

SUMMARY OF THE INVENTION

To solve the abovementioned problems, the present inventors have found that the leakage, the unclean appearance, and the damp or chill surface can efficiently be avoided by employing a predetermined non-woven fabric with a predetermined sparse-dense structure, thus leading to the completion of the present invention. More specifically, the invention provides the following.

In a first aspect of the present invention, an animal waste collection sheet entirely formed in a planar form is provided, including: a top sheet which is at least partially liquid permeable; a back sheet which is liquid impermeable; and an absorbent sheet disposed between the top sheet and the back sheet, in which the top sheet has a high fiber density region, with a fiber density higher than an average fiber density of the top sheet, at least in a part of a side facing the absorbent sheet in a thickness direction of the top sheet.

In a second aspect of the present invention, the animal waste collection sheet according to the first aspect is provided, in which the average fiber density is in the range of 0.005 to 0.20 $g/cm^3$ and a fiber density of the high fiber density region is in the range of 0.007 to 0.25 $g/cm^3$.

The present invention has a high fiber density region, with a fiber density higher than an average fiber density of the top sheet, at least in a part of a side facing the absorbent sheet in a thickness direction. Thus, the urine retained in a region having a relatively lower fiber density is promptly transferred to a high fiber density region by capillarity effect, and then further transferred to an absorbent sheet having a further higher density by capillarity effect. This allows a faster absorption and an improved drainage of the liquid on the top sheet, which keeps the surface dry and comfortable.

The difference of fiber density between the high fiber density region and the other regions of low fiber density is preferably in the range of 0.002 to 0.20 $g/cm^3$, more preferably in the range of 0.005 to 0.15 $g/cm^3$. Such difference in fiber density allows the abovementioned faster absorption and the improved drainage of the liquid.

It should be noted that, as mentioned above, the high-fiber density region is arranged to mediate the neighboring low-fiber density region and the absorbent sheet by means of capillarity effect. Thus, "at least in a part of a side facing the absorbent sheet" means that the high fiber density region may be arranged in any part between the absorbent sheet and the low fiber density region, and not necessarily in the whole area on the top sheet. Additionally, the high fiber density region may be either arranged allover in a thickness direction of the top sheet or arranged only on the side facing the absorbent sheet.

In a third aspect of the present invention, the animal waste collection sheet according to the first or the second aspect is provided, in which the top sheet is composed of a non-woven fabric alternately having a plurality of groove portions and a plurality of convex portions formed in a fixed direction, a side edge region of each of the plurality of convex portions of the top sheet has a fiber orientation parallel to the fixed direction, and the side edge region is the high fiber density region.

According to the abovementioned configuration, the urine retained in the central region of the convex portion having a lower fiber density than that of the edge region is transferred to the edge region having a higher density by capillarity effect, and then further transferred to the absorbent sheet having a further higher density by capillarity effect. This allows a faster absorption and an improved drainage of the liquid on the top sheet, which keeps the surface dry and comfortable.

Additionally, the discharged matter such as urine can be temporarily retained in the groove portions. The liquid can be held physically for a predetermined amount of time and inhibited from running on the surface layer to the edge of the top sheet. In addition, bulkiness due to the concave and convex portions increases the entire stiffness of the top sheet. This can avoid the rewetting (backset of liquid) when the animal steps on the sheet. Furthermore, light transmission thereof is lowered by the bulkiness due to the concave and convex portions. This can mask the urine trace and improve the appearance of the absorbent sheet, thus the same sheet can be used for increased number of times.

The bulkiness due to the concave and convex portions also lowers the thermal conductivity thereof. The damp or chill of the top sheet after a certain amount of time following a urination by an animal such as dog and cat can thus be reduced. When a sheet is used for a plurality of times of urination, animals are likely to avoid urinating in the vicinity of the point of previous urination, judging by color, odor, and temperature. Reduced damp or chill of the surface thereof makes the point of previous urination harder to be sniffed out by animals, thus encouraging the animal to urinate in the vicinity of the point of previous urination. This can prevent the urine from running over the sheet and can encourage the animal to egest on the same sheet repeatedly.

In a fourth aspect of the present invention, the animal waste collection sheet according to any one of the first to third aspects is provided in which an average weight of the top sheet is in the range of 20 to 250 g/m$^2$.

The top sheet in the present invention has the abovementioned sparse-dense structure which allows a faster absorption and an improved drainage of the liquid on the top sheet, thus keeping the surface dry and comfortable without unnecessarily increasing the thickness of the top sheet.

The present invention can effectively inhibit the leakage of liquid, the unclean appearance and the damp or chill surface without increasing the thickness and weight of the top sheet unnecessarily.

DETAILED DESCRIPTION OF THE INVENTION

An example of the animal waste collection sheet according to the present invention will be described hereinafter, with reference to drawings.

Overall Configuration

Figure 1:
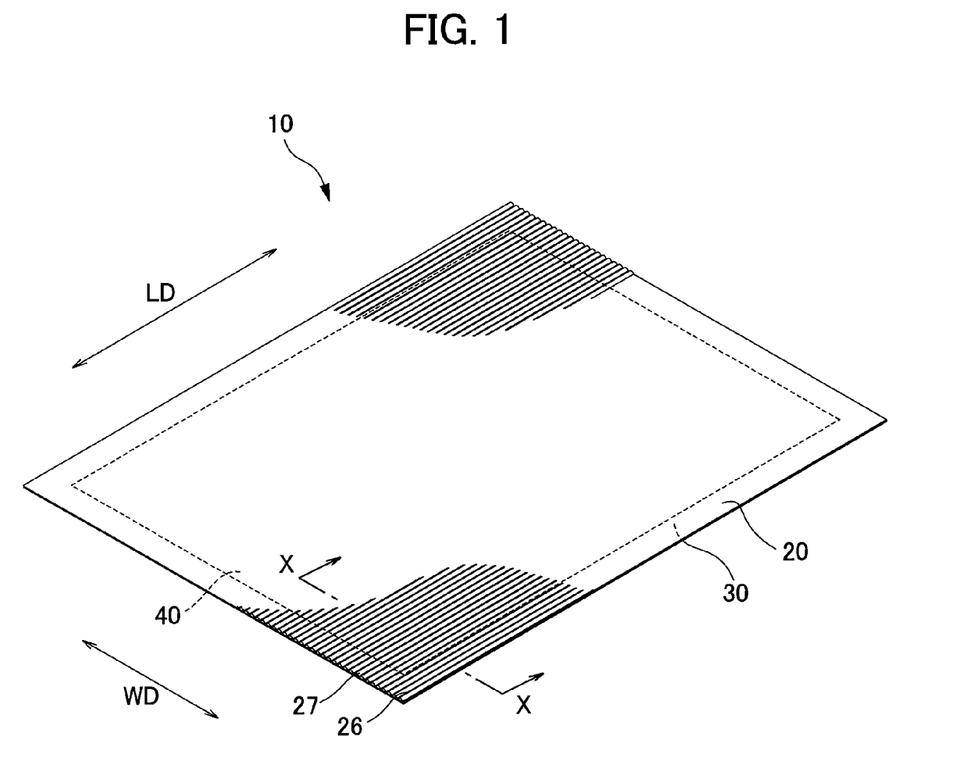
FIG. 1 is a perspective view illustrating an embodiment of an animal waste collection sheet of the present invention.

As shown in FIG. 1, the animal waste collection sheet 10 according to the present invention is entirely formed in a planar form. The animal waste collection sheet 10 includes: a top sheet portion 20 (also referred to as a top sheet 20) which is at least partially liquid permeable; a back sheet portion 30 (also referred to as a back sheet 30) which is a leakage-proof layer; and an absorbent sheet 40 which absorbs and retains liquid such as discharged matter, disposed between the top sheet portion 20 and the back sheet portion 30. The top sheet 20, the back sheet 30 and the absorbent sheet 40 are joined with a hotmelt adhesive. In the peripheral border of the animal waste collection sheet, the top sheet 20 and the back sheet 30 are joined with a hotmelt adhesive.

Size of the animal waste collection sheet 10 is not particularly limited and can be selected appropriately in accordance with the target animal and the size of cage in which the sheet 10 is used; however, the length in a longitudinal direction (LD) is preferably in the range of 30 to 120 cm, and the length in the width direction (WD) is preferably in the range of 20 to 100 cm. A planar dimension thereof is preferably no less than 600 cm$^2$, nor more than 12000 cm$^2$.

The top sheet 20 is a liquid permeable sheet disposed so as to cover the absorbent sheet 40, which transfers liquid such as discharged matter to the absorbent sheet 40. The top sheet 20 is a non-woven fabric having over the entire surface thereof a plurality of groove portions 26 and a plurality of convex portions 27 formed alternately in a longitudinal direction LD. The top sheet 20 will later be described in detail.

The back sheet 30 constitutes a leakage-proof layer of the animal waste collection sheet 10. The back sheet portion 30 is composed of the back sheet 30 which is liquid impermeable and a slip resistance portion (not shown) for fixing the animal waste collection sheet 10. The back sheet 30 can be any sheet substantially liquid impermeable, composed of conventionally known film materials such as polyethylene, polypropylene, polyester and the like.

Figure 2:
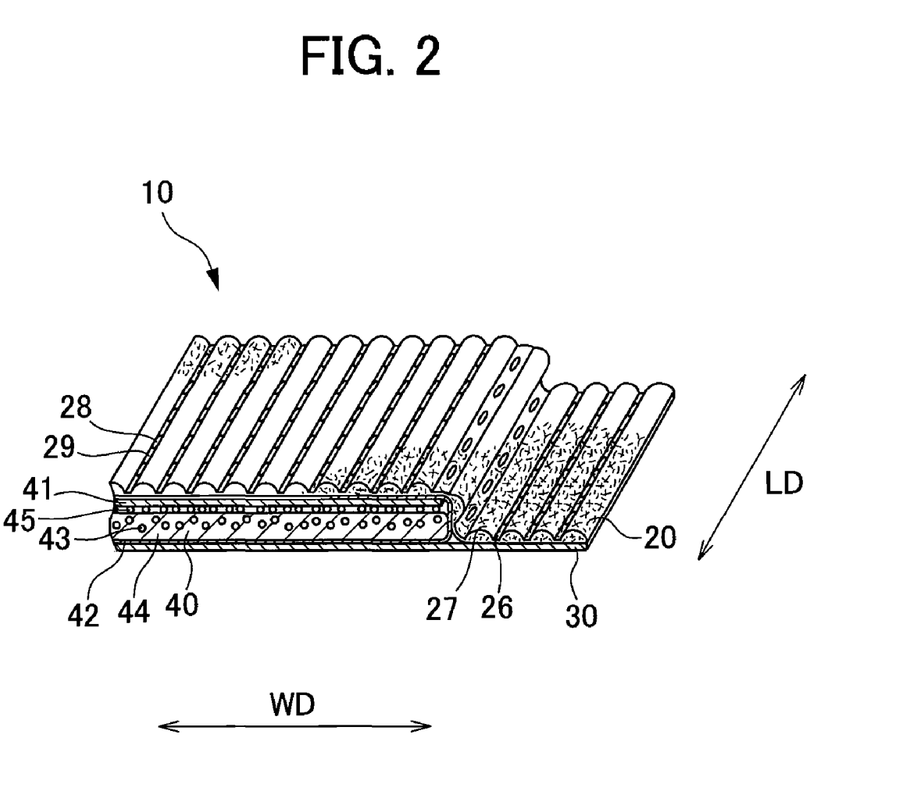
FIG. 2 is a partially enlarged view of a view along an arrow X-X of FIG. 1.

The absorbent sheet 40 is disposed in a substantially central region of the animal waste collection sheet 10 and absorb and retain liquid such as discharged matter discharged from animal's body. The absorbent sheet 40 is not particularly limited and can be any conventionally known absorbent sheet. The absorbent sheet 40 of the present embodiment is composed of, as shown in FIG. 2: a colored (e.g. blue) tissue 41 disposed on the top sheet 20-side; a lower layer tissue 42 with both ends in the width direction WD are turned up on the colored tissue 41, which is disposed on the back sheet 30-side; and a pulverized pulp layer 44 with a first high water-absorption resin 43 is uniformly blended therein, which is disposed between the colored tissue 41 and the lower layer tissue 42.

It should be noted that, in the present embodiment, material, shape, size and the like of each of the constituent members of the animal waste collection sheet 10 are not particularly limited; any conventionally known member can be appropriately used.

Top Sheet

The top sheet 20 can be a non-woven fabric with a plurality of groove portions 26 formed at substantially equal intervals, a plurality of convex portions 27 formed therebetween, and a plurality of openings 28 formed at predetermined intervals by a joining portion 29 in each of the groove portions 26.

Figure 3:
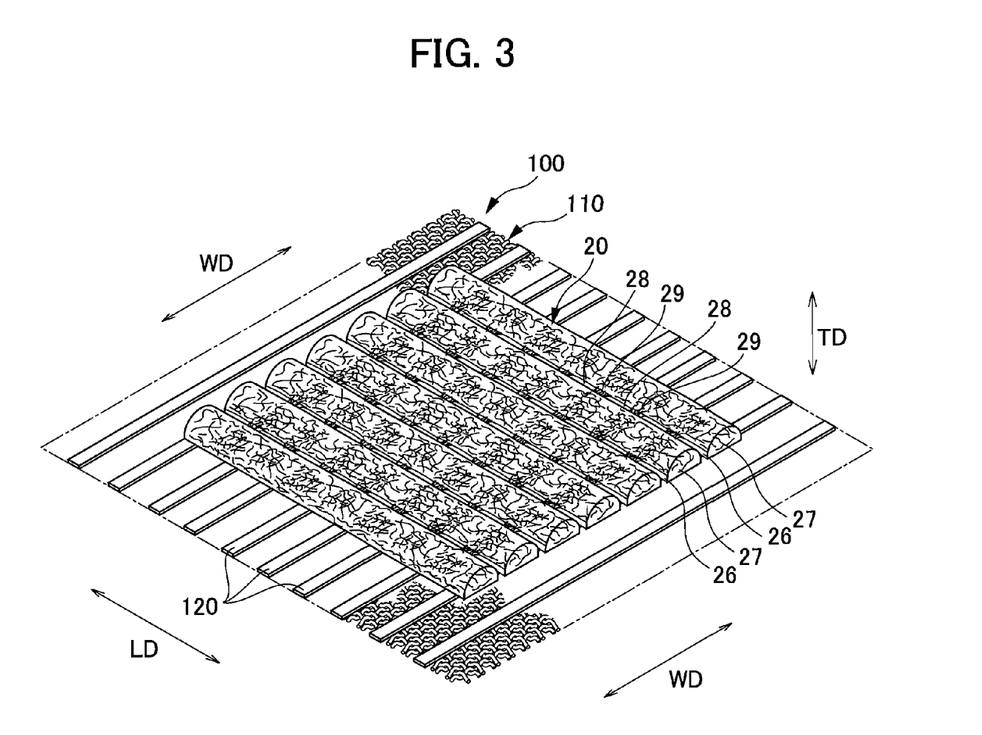
FIG. 3 is a diagram illustrating a manufacturing method of a top sheet used in the present invention.

Such non-woven fabric with a plurality of groove portions 26, a plurality of convex portions 27 and a plurality of openings 28 in each of the groove portions 26 can be formed, for example, using a support member 100, as shown in FIG. 3. The support member 100 is composed of: a net-shaped first supporting member 110; and plate-like second supporting members 120 disposed regularly at predetermined intervals in a direction orthogonal to the groove portions 26.

The groove portions 26 and the convex portions 27 are formed by: supporting a fiber web, which is a fiber aggregate, by the supporting member 100, which is air-permeable, from the lower surface thereof; and gas (e.g. air flow) is blown from the upper surface thereof against the positions of the plurality of groove portions 26 to push fibers away constituting the fiber web. At the same time, the joining portions 29 and the openings 28 are alternately formed by the second supporting members 120. The fiber aggregate is sheet-shaped and has a degree of freedom allowing the fiber thereof to move thereinside. The fiber orientation, the fiber density or the weight of the fiber can be arbitrary adjusted in accordance with several conditions, such as amount, tension and the like of blown fluid (for example hot air) composed of mainly gas. By the presence of the groove portions 26 on the top sheet 20 and of the openings on the groove portions, the abovementioned animal waste collection sheet, which has a superior liquid permeability, can be obtained.

The supporting member 100 of the present invention can be consisted solely of the first supporting member 110. In this case, only the joining portions 29 are provided, and not the openings 28, on the groove portions 26 of the top sheet 20.

Figure 4:
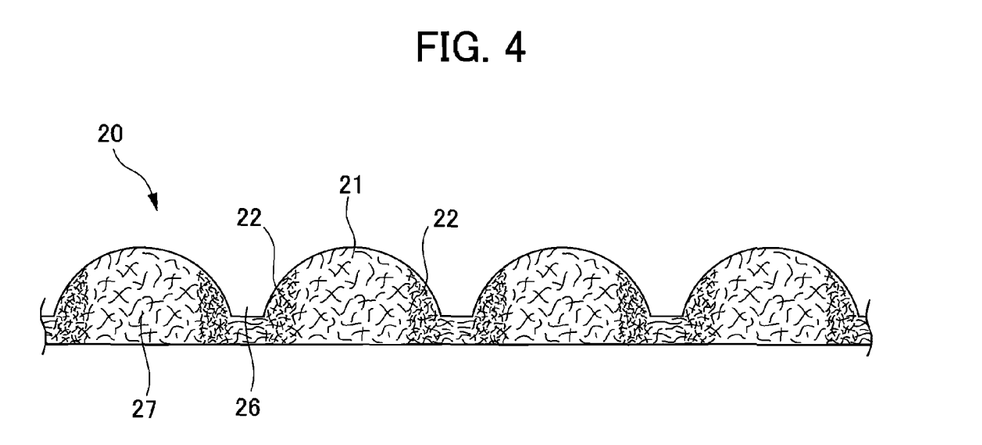
FIG. 4 is a cross-sectional schematic view of the top sheet shown in FIG. 3.
Figure 5A:
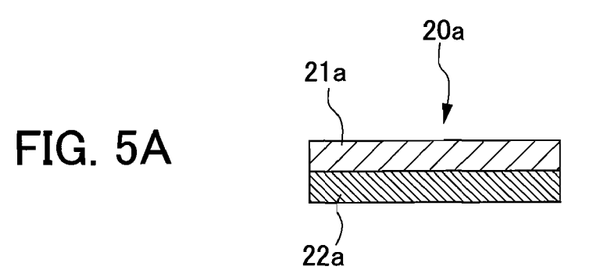
FIGS. 5A to 5F are cross-sectional schematic view illustrating other embodiments of a top sheet used in the present invention, respectively.
Figure 5B:
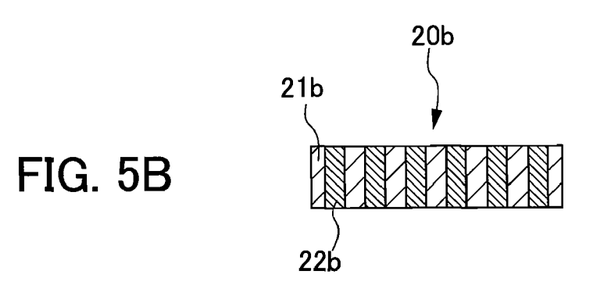
Figure 5C:
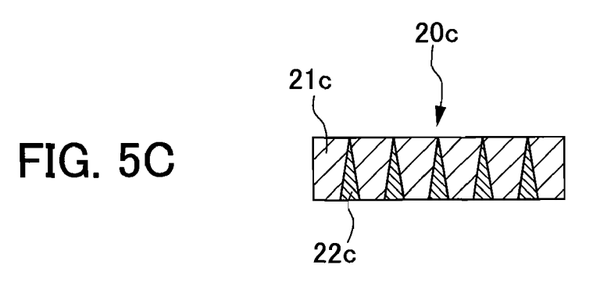
Figure 5D:
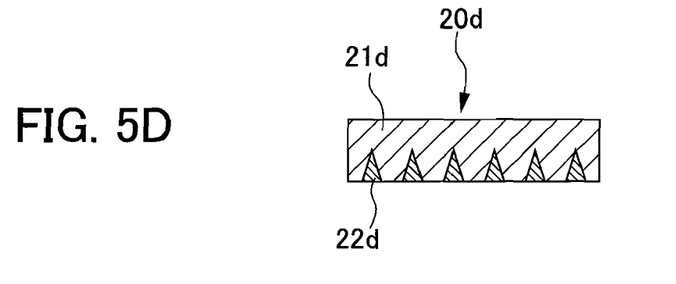
Figure 5E:
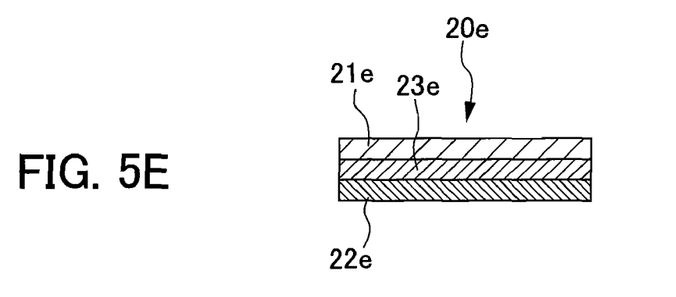
Figure 5F:
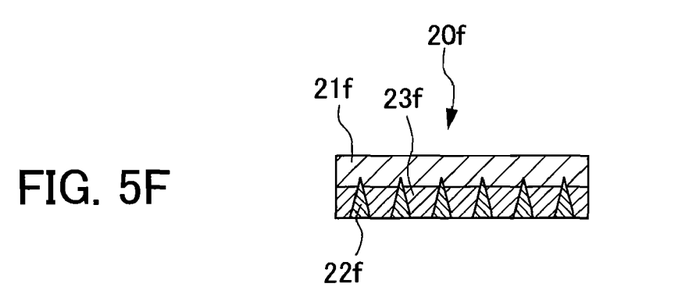

As a result of blowing air flow to arrange and rearrange the fiber, as shown in FIG. 4, each of the convex portions 27 has side edge portions and a central portions therebetween, with a thickness higher than that of the side edge portions. The side edge portions 22 correspond to the high fiber density regions in the present invention, having a substantially uniform fiber density in a thickness direction TD of the non-woven fabric, which is higher than an average fiber density of the entire convex portion 27 (side edge portions and a central portion). The central portion 21 corresponds to the low fiber density region in the present invention, having a substantially uniform fiber density in a thickness direction TD of the non-woven fabric, which is lower than an average fiber density of the entire convex portion 27 (side edge portions and a central portion).

Example of the fiber density at the bottom of the groove portions 26 includes, specifically: no greater than $0.18$ $g/cm^3$; preferably in the range of $0.002$ to $0.18$ $g/cm^3$; more preferably in the range of $0.005$ to $0.05$ $g/cm^3$. If the fiber density of the bottom portion of the groove portions 26 is less than $0.002$ $g/cm^3$, the top sheet 20 used in an animal waste collection sheet, for example, may easily be damaged. If the fiber density at the bottom portion of the groove portions 26 is greater than $0.18$ $g/cm^3$, it is difficult for the liquid to travel downward and will be retained at the groove portions 26, giving a user (such as a pet animal and a pet owner) a moist sensation.

Fiber density at the central region 21 of the convex portions 27 is in the range of 0 to $0.20$ $g/cm^3$; preferably in the range of $0.005$ to $0.20$ $g/cm^3$; more preferably in the range of $0.007$ to $0.07$ $g/cm^3$, for example. If the fiber density of the central region 21 is less than $0.005$ $g/cm^3$, not only is it easier for the central region 21 to be crushed by the weight of the liquid contained in the central regions or by external pressure, but it also becomes easier for the liquid once absorbed in the absorbent article to reverse back, under the applied pressure. If fiber density at the central region 21 is greater than $0.20$ $g/cm^3$, it is difficult for the liquid contained at the central region 21 to travel downward and will be retained in the groove portion, giving a user (such as a pet animal and a pet owner) a moist sensation.

Fiber density at the side edge region 22 of the convex portions 27 is in the range of 0 to $0.40$ $g/cm^3$; preferably in the range of $0.007$ to $0.25$ $g/cm^3$; more preferably in the range of $0.01$ to $0.20$ $g/cm^3$, for example. If the fiber density at the side edge portions 22 is less than $0.007$ $g/cm^3$, there may be cases in which the side edge portion will become stretched by line tension. If the fiber density at the side edge regions 22 is greater than $0.40$ $g/cm^3$, it is difficult for the liquid contained at the side edge regions 22 to travel downward. Thus, the liquid will be retained at the side edge regions 22, giving a user (such as a pet animal and a pet owner) a moist sensation.

According to the abovementioned configuration, fiber constituting the side edge regions 22 of the convex portions 27 is rearranged to an orientation in the longitudinal direction LD and the density thereof is high. Thus, the bulkiness of the side edge regions 22 and the convex portions 27 makes the bending stiffness in the longitudinal direction LD high. This allows the central region 21 to be supported by the high-stiffness side edge regions 22 positioned on the both sides thereof, in cases in which the external pressure is applied to the convex portions 27. This makes the plurality of convex portions 27 resistant to crushing due to the external pressure. Consequently, the side edge regions 22 make the bending stiffness in the longitudinal direction LD high. In addition to the increased bending stiffness due to the bulkiness of the convex portions, the increased resilience to the original shape after bending is obtained due to the bulk resilience of the convex portions.

On the other hand, as a result of blowing air flow to arrange and rearrange the fiber, the groove portions 26 have a weight lighter than that of the convex portions 27. Therefore, the top sheet can easily bend at the groove portion 26 in the width direction.

A fiber web formed by the carding method using relatively long fibers is suitable for arranging and rearranging the fibers by blowing air flow. In order that after groove portions (concave and convex portions) are formed by a plurality of air flows, the fibers are made into a non-woven fabric with its shape retained, it is preferable to employ a through-air method where thermoplastic fibers are subjected to hot melting by oven processing (heat treatment). Fibers suitable for this manufacturing method are preferably those having the core-in-sheath structure or side-by-side structure in order to heat-seal intersecting points of the fibers or are more preferably those having the core-in-sheath structure in which sheaths can be infallibly heat-sealed. Specifically, the sheath-core type compound fiber consisting of polyethylene terephthalate and polyethylene, or the sheath-core type compound fiber consisting of polypropylene and polyethylene is preferably used. These fibers may be used alone or in combination. The length of fibers is preferably in the range of 20 to 100 mm, and more preferably in the range of 35 to 65 mm.

The sparse-dense structure of a top sheet for the present invention is not limited to the abovementioned top sheet 20 and may include many other structure as top sheets 20a to 20f of FIGS. 5A to 5F. In FIGS. 5A to 5F, 21a to 21f are low fiber density regions; 22a to 22f are high fiber density regions; and 23e and 23f are medium fiber density regions. These top sheets can be manufactured by any conventionally known method. For example, the top sheets 20a, 20e and 20f can be manufactured by layering layers of different fiber diameters to obtain a multilayered non-woven fabric. Alternatively, the top sheets 20a and 20c can be manufactured by layering layers of different densities shaped with different compressive force to obtain a multilayered non-woven fabric. Additionally, the top sheets 20b, 20c, 20d and 20f can be manufactured by compressing irregularly laminating fibers to an even thickness.

Thickness of the top sheet 20 is preferably greater than 0.6 mm, more preferably in the range of 0.6 to 3.5 mm, particularly preferably in the range of 0.7 to 3.0 mm, and most preferably in the range of 1.0 to 2.5 mm. If the thickness is less than 0.6 mm, the entire sheet becomes easy to bend, and the liquid holding capacity of the sheet and the liquid retentive capacity of the abovementioned concave and convex portions become insufficient. Thickness greater than 3.5 mm is not preferable because transfer of liquid to the absorbent sheet 40 may be inhibited and the target animals may not recognize the sheet as litter due to the increased thickness.

Example of an average weight of the top sheet 20 includes, for example, 10 to 200 $g/m^2$, preferably 20 to 100 $g/m^2$. When the average weight is less than 10 $g/m^2$, the top sheet 20 may easily be broken during use. Additionally, if the average weight is greater than 200 $g/m^2$, downward transfer of liquid may be inhibited.

An average weight of the bottom of the groove portions 26 is in the range of 3 to 150 $g/m^2$ and preferably in the range of 5 to 80 $g/m^2$, for example. The average weight of the convex portions 27 is adjusted so as to be higher than that of the groove portions 26; an average weight of the central region 21 of the convex portions 27 is, for example, in the range of 15 to 250 $g/m^2$ and preferably in the range of 20 to 120 $g/m^2$. The average weight of the side edge regions 22 is, for example, in the range of 20 to 280 $g/m^2$; preferably in the range of 25 to 150 $g/m^2$.

In the abovementioned embodiment, the top sheet 20 used in the animal waste collection sheet 10 has: the groove portions 26 allowing the liquid to permeate; and the convex portions 27 having a porous structure and thus is difficult to retain the liquid. The fiber density and the weight of the bottom portion of the groove portions 26 is lower than that of the other areas, thus being suitable for allowing the liquid to permeate. It is particularly the case with the openings 28. As the fibers on the bottom of the groove portions 26 are oriented in the width direction WD, it is possible to prevent wide spreading of the liquid excessively flown in the longitudinal direction LD of the groove portions 26. The fibers are oriented in the width direction WD of the groove portions 26, so regardless of the fact that the weight is lower than that of other areas, the strength thereof in the width direction WD of the first supporting member 110 is increased. The weight of the convex portions 27 are adjusted to be greater than that of the other areas, and because this increases the number of fibers, the number of fusion points also increases and the porous structure is maintained.

EXAMPLE

The present invention is described in further detail below while referring to working examples.

Manufacturing Example (Example 1)

A through-air non-woven fabric of a weight of 35 g/m² and a thickness of 1.96 mm for the top sheet 20 was manufactured using a hydrophilic core-in-sheath compound fiber consisting of polyethylene terephthalate and polyethylene (fiber diameter 3.3 dtex, fiber length 50 mm) in a method shown in FIG. 3, with: a plurality of groove portions 26 formed on one side thereof at equal intervals; a plurality of convex portions 27 formed therebetween; and a plurality of openings 28 formed in each of the groove portions 26.

Example 1 was obtained by manufacturing an animal waste collection sheet 10 of 450 mm in LD and 345 mm in WD (absorbent sheet 410 mm in LD and 300 mm in WD), shown in the abovementioned FIGS. 1 and 2, bonding the sheets to each other by hot melt adhesion, using the following constitutive materials in addition:
a colored tissue 41 of 15 g/m² in weight;
a lower layer tissue 42 (uncolored) of 14 g/m² in weight;
a first high-water absorption resin 43, uniformly blended into a pulverized pulp layer at a ratio of 33 g/m² with vortex for 5 seconds;
a pulverized pulp layer 44 of an average fiber length approximately of 2.2 mm and of 60 g/m² in weight, obtained by pulverizing NBKP (bleached softwood kraft pulp) sheet;
a second high-water absorption resin 45, with vortex for 35 seconds and a spray volume of 33 g/m²; and
a back sheet 30, an air-impermeable polyethylene film of 18.5 g/m² in weight.

Manufacturing Example (Example 2, Comparative Examples 1 to 8)

Example 2 and Comparative examples 1 to 4 were obtained by changing the configuration of the top sheet of Example 1 as shown in Table 1. Weight and thickness of the non-woven fabric of Example 2 were different from that of Example 1. Non-woven fabrics of Examples 3 to 6 were two-layered as in the top sheet 20a shown in FIG. 5A; a hydrophilic core-in-sheath compound fiber, consisting of polyethylene terephthalate and polyethylene, of 2.2 dtex and of fiber length of 50 mm in a lower layer; and a hydrophilic core-in-sheath compound fiber, consisting of polyethylene terephthalate and polyethylene, of 4.4 dtex and of fiber length of 50 mm in an upper layer.

It should be noted that, in Tables, TA refers to a through-air non-woven fabric; PB refers to a point bond non-woven fabric; SB refers to a spunbond non-woven fabric; and SMS refers to a spunbond/melt blown/spunbond non-woven fabric. Thickness of top sheets was obtained by layering 10 sheets, measuring using UF-60A (manufactured by DAIEI KAGAKU SEIKI MFG. CO., LTD.) with a load of 3 g and obtaining a value for one sheet.

Test Example 1

Regarding Examples and Comparative examples, amount of normal saline solution absorbed by a top sheet thereof is shown in Table 1 and result of evaluating leakage of normal saline solution is shown in Table 2.

Amount absorbed by a top sheet was measured by the following procedure:
1. Measuring the weight of a sample in size of 10 cm×10 cm;
2. Impregnating the sample in a 0.9% normal saline solution for 10 minutes;
3. After impregnating, taking the sample out of the normal saline solution and hanging for 10 minutes;
4. Calculating the amount of liquid being absorbed by measuring the weight of the sample.

Values of leakage evaluation were obtained by: dripping 40 cc (60 cc) of a 0.9% normal saline solution from a height of 3 cm to positions located 2 cm and 4 cm inside of the end of an absorbent sheet of the sheet, in 8 seconds (12 seconds); and measuring the amount (g) of the normal saline solution running over the sheet and leaked from the product.

Surface drying speed for 40 cc liquid was obtained by: dripping 40 cc of a 0.9% normal saline solution from a height of 3 cm to a central portion of an absorbent sheet thereof in 8 seconds; and measuring the time (seconds) required for the normal saline solution to be absorbed by the absorbent sheet and to completely disappears from the top sheet.

TABLE 1

| | Type of Surface Sheet | Presence of Concavity and Convexity On Surface | Weight (g/m²) | Thickness (mm) | Amount of Absorbed Liquid (g/m²) |
|---|---|---|---|---|---|
| Example 1 | TA | Yes | 35 | 1.96 | 536 |
| Example 2 | TA | Yes | 35 | 1.52 | 580 |
| Example 3 | TA | No | 35 | 0.89 | 500 |
| Example 4 | TA | No | 40 | 1.44 | 230 |
| Example 5 | TA | No | 25 | 0.87 | 119 |
| Example 6 | TA | No | 20 | 0.74 | 116 |
| Comparative Example 1 | PB | No | 18 | 0.23 | 58 |
| Comparative Example 2 | SB | No | 20 | 0.28 | 62 |
| Comparative Example 3 | SMS | No | 13 | 0.14 | 55 |
| Comparative Example 4 | Perforated Film | No | 20 | 0.54 | 92 |

TABLE 2

| | 40 cc Dripped | | 60 cc Dripped | | Surface |
| --- | --- | --- | --- | --- | --- |
| | 2 cm Inside | 4 cm Inside | 2 cm Inside | 4 cm Inside | Drying Speed for 40 cc Liquid |
| Example 1 | 0 | 0 | 0 | 0 | 16 |
| Example 2 | 0 | 0 | 0 | 0 | 20 |
| Example 3 | 0 | 0 | 6 | 0 | 25 |
| Example 4 | 0 | 0 | 10.1 | 0 | 28 |
| Example 5 | 0 | 0 | 7.4 | 0 | 18 |
| Example 6 | 0 | 0 | 7.8 | 6.5 | 20 |
| Comparative Example 1 | 7.2 | 3.5 | — | — | 60 |
| Comparative Example 2 | 7.8 | 2.7 | — | — | 50 |
| Comparative Example 3 | 9.6 | 1.1 | — | — | 60 |
| Comparative Example 4 | 12.6 | 0 | — | — | 10 |

As shown in the results shown in Tables 1 and 2, the present invention provides (1) a high absorption speed allowing to completely absorb the liquid, realized by the sparse-dense structure on the top sheet. This is also apparent from the abovementioned surface drying speed. Additionally, as is apparent from the abovementioned amount of absorbed liquid, the present invention provides (2) an increased absorption amount which inhibits leakage even with an increased thickness. As described above, the present invention can simultaneously provide (1) a high absorbing speed and (2) a high absorption amount, thus allowing a rapid absorption and a dry surface.

Test Example 2

Regarding Examples 1 and 3, and Comparative Examples 1, 2 and 4, result of the evaluation regarding unclean appearance and damp or chill (cold sensation) of the surface is shown in Table 3. Masking property was evaluated by adding 0.45 g of Sunset Yellow FCF and 0.0075 g of Brilliant Blue FCF to 15 L of normal saline solution, dripping 40 cc thereof in 10 seconds on a sample, and then evaluating by visual observation after 3 minutes according to 5 ranks: 5—Clearly Visible; 4—Visible; 3—Somewhat Visible; 2—Slightly Visible; and 1—Almost Invisible. Likewise, cold sensation was evaluated by adding 0.45 g of Sunset Yellow FCF and 0.0075 g of Brilliant Blue FCF to 15 L of normal saline solution, dripping 40 cc thereof in 10 seconds on a sample, and then evaluating according to 5 ranks after 30 minutes. The smaller value means less cold sensation, thus being preferable.

TABLE 3

| | Masking Property of Yellow NSS | Cold Sensation After 30 min |
| --- | --- | --- |
| Example 1 | 1 | 1 |
| Example 3 | 3 | 3 |
| Comparative Example 1 | 5 | 5 |
| Comparative Example 2 | 4 | 5 |
| Comparative Example 4 | 2 | 1 |

As shown in Table 3, the present invention has a superior masking property and a less cold sensation, thus being preferable. Although Comparative Example 4 also has a superior masking property and a less cold sensation, Comparative Example 4 showed an undesirable result regarding leakage as shown in Test Example 1.

What is claimed is:

1. An animal waste collection sheet entirely formed in a planar form, comprising: a top sheet which is at least partially liquid permeable; a back sheet which is liquid impermeable; and an absorbent sheet disposed between the top sheet and the back sheet, wherein the top sheet has a high fiber density region, having a fiber density higher than an average the fiber density in another region of the top sheet; a low fiber density region included in the another region, and a first region having fiber density lower than and average fiber density of the high density region and the low fiber density region, the high fiber density region and the low fiber density region extend along a thickness direction of the top sheet from an upper surface to a back face thereof, respectively; and a bottom of the groove portions has a fiber density no greater than 0.18 g/cm$^3$;

the central region of the convex portion has a fiber density in the range of 0.005 to 0.20 g/cm$^3$; and the side edge region of the convex portions has a fiber density in the range of 0.007 to 0.40 g/cm$^3$.

2. The animal waste collection sheet according to claim 1, wherein the fiber density in the another region is in the range of 0.005 to 0.20 g/cm$^3$ and the fiber density of the high fiber density region is in the range of 0.007 to 0.25 g/cm$^3$.

3. The animal waste collection sheet according to claim 2, wherein the top sheet is composed of a non-woven fabric alternately having a plurality of groove portions and a plurality of convex portions formed in a predetermined direction, a side edge region of each of the plurality of convex portions of the top sheet has a fiber orientation parallel to the fixed direction, and the side edge region is the high fiber density region.

4. The animal waste collection sheet according to claim 3, wherein an average weight of the top sheet is in the range of 20 to 250 g/m$^2$.

5. The animal waste collection sheet according to claim 1, wherein the top sheet is composed of a non-woven fabric alternately having a plurality of groove portions and a plurality of convex portions formed in a predetermined direction, a side edge region of each of the plurality of convex portions of the top sheet has a fiber orientation parallel to the predetermined direction, and the side edge region is the high fiber density region.

6. The animal waste collection sheet according to claim 1, wherein an average weight of the top sheet is in the range of 20 to 250 g/m$^2$.

7. The animal waste collection sheet according to claim 1, wherein the top sheet consists of a single fiber layer that has been subjected to an air blowing process which has arranged and rearranged fiber of the web layer before fixing fibers in the web layer to form the high fiber density region, the low fiber density region, and the first region.

8. The animal waste collection sheet according to claim 1, wherein the high fiber density region, the low fiber density region, and the first region are formed parallel in stripes, the high fiber density region being formed on each side of the low fiber density region, and the first region being formed on a side of the high fiber density region that is not adjacent to the low fiber density region.

* * * * *